July 30, 1935.  R. S. FALKINER  2,009,729
HARVESTING OF SUGAR CANE
Filed June 20, 1931   2 Sheets-Sheet 2
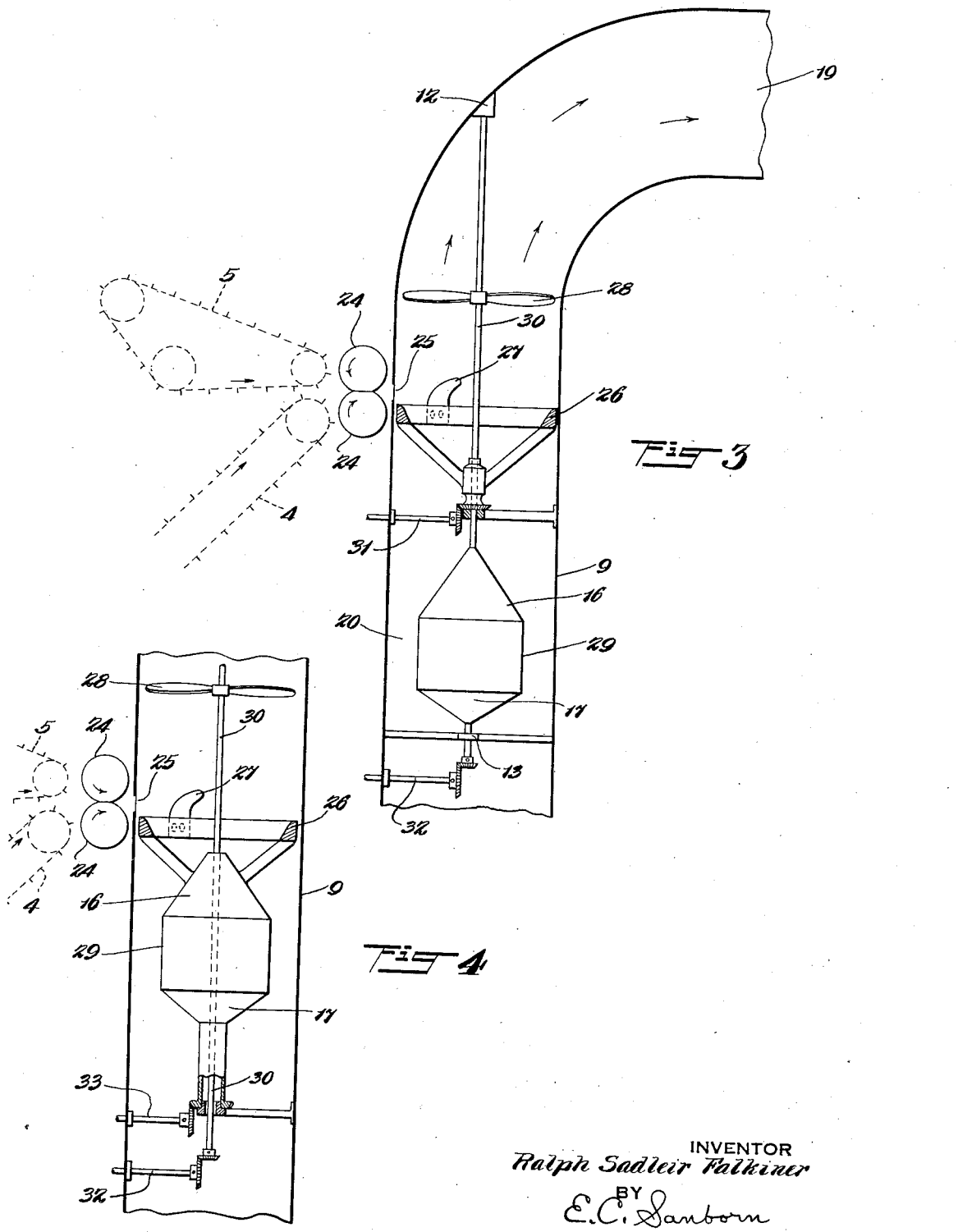
INVENTOR
Ralph Sadleir Falkiner
BY
E. C. Sanborn
ATTORNEY Patented July 30, 1935

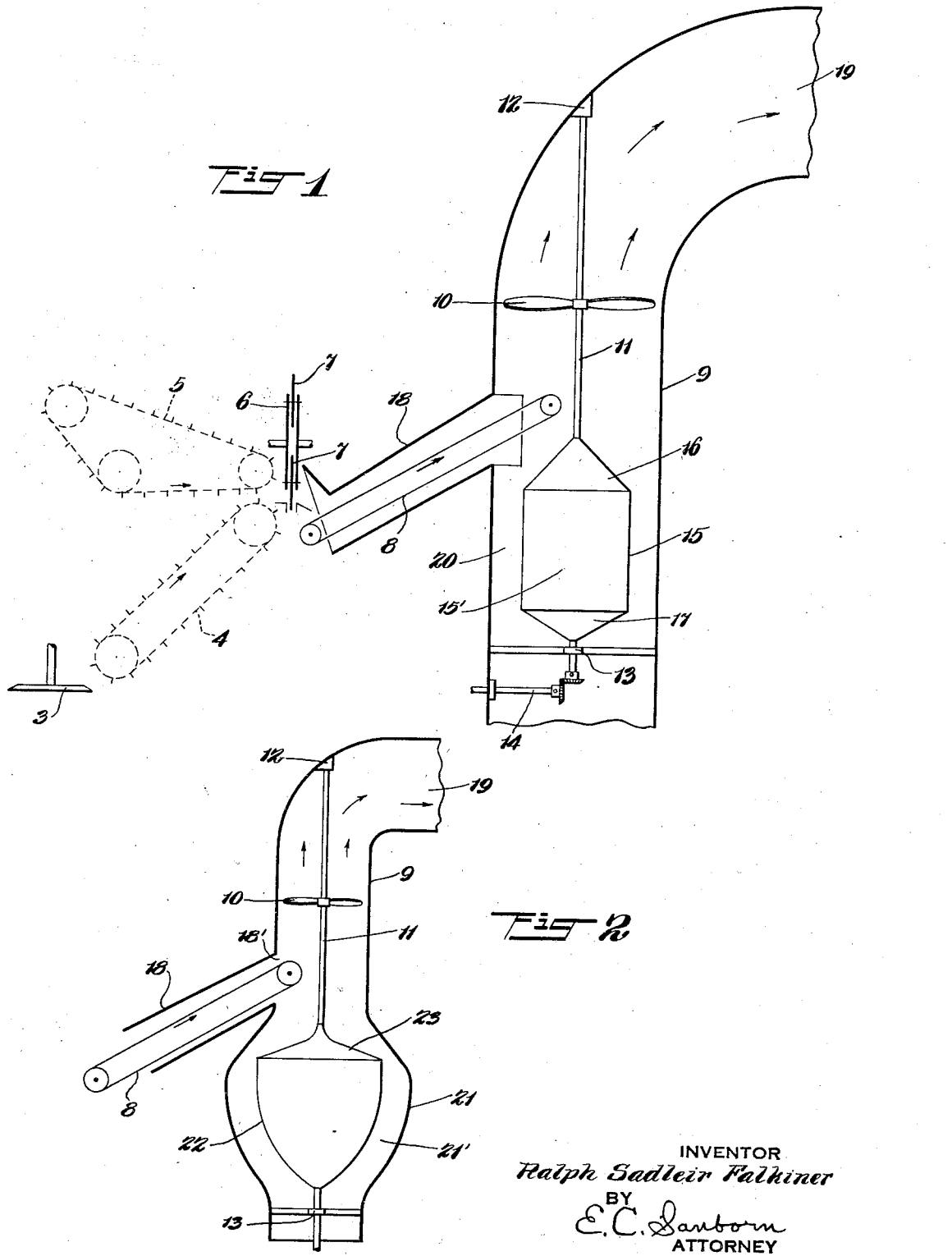

2,009,729

UNITED STATES PATENT OFFICE 2,009,729

HARVESTING OF SUGAR CANE

Ralph Sadleir Falkiner, Melbourne, Victoria, Australia, assignor to Falkiner Cane Harvester Corporation of America, New York, N. Y., a corporation of New York Application June 20, 1931, Serial No. 545,762

7 Claims. (Cl. 209—150)

This invention relates to the harvesting of sugar can and provides a novel method of and apparatus for effecting separation of the good cane from the leaves, tops, and other attendant trash. A feature of the invention resides in subjecting the cane and trash to the action of a vertical air blast, and also to the centrifugal force of a rotating member, for accomplishing separation of the trash from the cane. Other features of the invention will be hereinafter described and claimed.

In the accompanying drawings:

Fig. 1 is a diagrammatic view of a cane harvesting machine having one form of the invention applied thereto.

Fig. 2 is a detail view showing a modified form of the invention, and

Fig. 3 is a view of another modification thereof.

Fig. 4 is a detail view of a further modification.

Referring to Fig. 1 of the drawings, the invention is shown applied to a cane harvesting machine of known type; the machine comprising ground cutting knives 3 (only one being shown) for severing the cane, and a moving conveyor 4 cooperating with a second moving conveyor 5 for feeding the severed cane and trash to a chopping mechanism. The latter may take the form of a rotating disk 6 having knives 7. The pieces of cane and trash chopped by said knives 7 are received upon a conveyor 8 for transfer to the separating mechanism.

In carrying out my invention, in the form shown in Fig. 1, I provide a vertical stack 9 in which there is rotatably mounted a fan 10 for creating an upward current of air through said stack. The fan may as shown be secured to a shaft 11 journaled in bearings 12, 13 in said stack. Any suitable means may be provided for rotating said shaft. As indicated, said shaft may be driven through bevel gearing by a shaft 14 operated from a suitable source of power. Mounted on the shaft 11 below the fan 10 for rotation therewith is a drum 15, having its end portions 16, 17 of conical formation. The conveyor 8 is shown positioned in side extension 18 of the stack, said extension communicating with the interior of the stack so that the current of air in the latter aids in drawing the chopped pieces of cane and trash into said stack.

In operation, the fan 10 draws air upwardly through the open bottom end of the stack and maintains an upward current of air therein. As the pieces of cane and trash are discharged by the conveyor 8 into said upward air current, the light trash, leaves, and cane tops are drawn upwardly by said current and are carried thereby through the open end of the horizontal upper extension 19 of the stack. The pieces of good cane, being heavier than said trash, drop downwardly on to the upper conical portion 16 of the rotating drum 15 and thence move down over said conical portion and into the channel 20 between the main body portion 15' of said drum and the walls of the stack. The material deposited on said conical portion 16 is also subjected to the air current, so that trash or lighter material falling with the good cane upon said conical portion will be carried upwardly by the current. In addition, the rotation of the drum 15 aids in separating such trash or lighter material from the good cane, since the centrifugal force resulting from said rotation throws the good cane outwardly with greater force than is imparted to the lighter material. Any trash entangled with or wound around the good cane and passing therewith into the channel 20 between the air stack and the drum 15 is subjected during its travel in said channel to the concentrated air current passing upwardly therethrough, whereby said current is enabled to remove the entangled light material from the pieces of good cane. The length of time during which the concentrated current aforesaid acts upon the cane depends of course upon the length of the channel 20, or, in other words, on the length of the body portion 15' of the drum. The good cane finally passes through the bottom open end of the drum and thence into a chute or onto a conveyor for delivery into a wagon or other container.

In Fig. 2 a modified form of drum and stack is shown. The stack in this view is provided with an enlarged intermediate portion 21 in which is positioned the drum 22 the main body portion of which is curved both horizontally and longitudinally as shown. The upper portion 23 of said drum is of curved concave contour as indicated. As in the form shown in Fig. 1 the drum, as well as the fan 10, is secured to shaft 11 to rotate therewith; and the conveyor 8 extends through the extension 18 of the vertical stack. It will be noted that the channel 21' is curved, following the contour of the member 22 and enlarged portion 21 and that the distance of travel of cane and any entangled trash through the concentrated air current in said channel is thus increased. Also, since the maximum diameter of the member 22 is greater than the diameter of the stack at the opening 18' through which the conveyor 8 extends, said conveyor need extend only a minimum distance into said stack for depositing cane and trash on said member. The operation of this form of the invention for separating the leaves, tops, and other attendant trash from the pieces of good cane is the same as that above set forth in connection with Fig. 1.

In the form of the invention shown in Fig. 3 the cane after being severed from the ground may be fed by the conveyors 4, 5 between a pair of rollers 24 having pneumatic or resilient tires and thence through an opening 25 in the vertical stack. Rotatably mounted within said stack is a fly-wheel 26 which carries a knife 27. As said fly-wheel rotates it carries said knife successively and at a rapid rate past the opening 24 whereby said knife, in cooperation with an edge of said opening, cuts the cane stalks and trash into pieces of desired length. Also mounted within the stack is a fan 28 which creates an upwardly moving current of air. A rotating drum 29 is mounted below the fly-wheel. The pieces of cane cut by the knife 27 drop through the air current, while the lighter material consisting of the tops, leaves, and other trash are carried upwardly by said current, the rotating drum assisting in the separation as previously outlined in conjunction with Figs. 1 and 2. The fly-wheel 26 may be driven separately and at a different speed from the fan 28. This may be accomplished in any suitable way as for example, by mounting the fly-wheel rotatably on the fan shaft 30 and driving said fly-wheel from shaft 31, while at the same time driving the fan shaft from another shaft 32. The drum 29 may be fastened to shaft 30 for rotation therewith. Alternatively, the fly-wheel 26 and drum 29 may, as shown in Fig. 4, be mounted to turn freely as a unit on the fan shaft 30; the latter operated by one drive shaft 32 and the drum and fly-wheel by a separate drive shaft 33.

Similarly, in the constructions shown in Figs. 1 and 2 the drum may, if desired, be driven at a different speed from that of the fan.

By the term "trash" in the ensuing claims, I intend to refer to any material such as leaves, tops, or extraneous matter lighter than the good cane.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a cane harvesting apparatus, a vertical stack, means for creating an ascending current of air through said stack, means in the lower part of the stack for concentrating the air current, and means for causing pieces of cane and trash to be deposited in said air current, said second named means being of substantial vertical extent as compared to the height of the stack.

2. In a cane harvesting apparatus, a vertical stack, means for creating an ascending current of air through said stack, means for causing pieces of cane and trash to be deposited in said air current, a rotatable member in said stack for receiving pieces of cane and trash and applying centrifugal force thereto, said member having a solid top face extending across the central portion of the stack, and means below said member having side walls forming with the stack a passage of substantial vertical extent and restricted cross sectional area as compared to the cross sectional area of the stack above said member and adapted to receive pieces of cane and trash from said member.

3. In a cane harvesting apparatus, a vertical stack having therein a fan for creating an ascending current of air therethrough, a rotatable member below said fan and having a continuous upper surface and side walls of substantial vertical extent spaced from the walls of said stack to provide a channel between said walls and said member, said channel having a smaller cross-sectional area than the stack and means for introducing pieces of cane and trash into said stack at a point between said member and said fan.

4. In a cane harvesting apparatus, a vertical stack having therein a fan for creating an ascending current of air therethrough, a rotatable member below said fan and spaced from the walls of said stack to provide a channel between said walls and said member, said channel extending vertically in said stack and being of restricted cross-sectional area as compared with the portion of the stack above said member, said stack having an opening in its side intermediate said fan and said member and having also an upwardly inclined extension communicating with said opening, and means in said extension for conveying cane and trash and delivering the same through said opening into said stack.

5. In a cane harvesting apparatus, a vertical stack having an opening in the side thereof, means for delivering cane and trash through said opening into said stack, a rotatable knife in said stack cooperating with an edge of said opening for cutting the cane and trash into pieces, a fan in said stack for creating an ascending current of air therethrough for separating trash from the cane, and a rotatable member below said opening for receiving pieces of cane and trash and imparting a centrifugal action thereto to assist in separation thereof.

6. In a cane harvesting apparatus, a vertical stack having an opening in the side thereof, means for delivering cane and trash through said opening into said stack, a rotatable fly-wheel in said stack carrying a knife for cooperation with an edge of said opening for cutting the cane and trash into pieces, a fan in said stack for creating an ascending current of air therethrough for separating trash from the cane, and a rotatable member below said opening for receiving pieces of cane and trash and imparting a centrifugal action thereto to assist in separation thereof.

7. In a cane harvesting apparatus, a vertical stack having an opening in the side thereof and having a portion of enlarged diameter and with downwardly curved walls below said opening, a rotatable member in said enlarged portion having downwardly curved walls corresponding to the walls of said enlarged portion to provide a curved channel between said member and said walls, the maximum diameter of said member being greater than the diameter of the stack at said opening, and a fan in said stack above said opening for creating an ascending current of air through the stack.

RALPH SADLEIR FALKINER.